US006981999B1

(12) United States Patent
Shoshany et al.

(10) Patent No.: US 6,981,999 B1
(45) Date of Patent: Jan. 3, 2006

(54) SAND LIME SHAPED PRODUCT

(75) Inventors: Haggai Shoshany, Tel Aviv (IL); Amnon Shoshany, Tel Aviv (IL)

(73) Assignee: HA Industrial Technologies Ltd., Tel Aviv (IL)

( * ) Notice: Subject to any disclaimer, the term of this patent is extended or adjusted under 35 U.S.C. 154(b) by 0 days.

(21) Appl. No.: 11/094,248

(22) Filed: Mar. 31, 2005

(51) Int. Cl.
*C04B 28/20* (2006.01)
*C04B 40/02* (2006.01)
*B28B 11/24* (2006.01)

(52) U.S. Cl. ...................... 106/660; 106/794; 106/795; 264/675

(58) Field of Classification Search ................ 106/660, 106/794, 795; 264/675
See application file for complete search history.

(56) References Cited

U.S. PATENT DOCUMENTS

| | | | | |
|---|---|---|---|---|
| 2,305,113 | A * | 12/1942 | Scripture, Jr. | 106/661 |
| 4,775,505 | A * | 10/1988 | Kuroda et al. | 264/82 |
| RE34,880 | E * | 3/1995 | Salyer | 106/660 |
| 6,468,344 | B1 * | 10/2002 | Liang et al. | 106/660 |

* cited by examiner

*Primary Examiner*—David Brunsman
(74) *Attorney, Agent, or Firm*—Dekel Patent Ltd.; David Klein

(57) ABSTRACT

A sand lime shaped product including wax mixed with sand and lime formed into a shaped product having a density of at least 200 kg/m$^3$. A method for making a sand lime shaped product is also disclosed, including mixing wax with sand and lime to form a mixture; and forming the mixture into a shaped product.

19 Claims, No Drawings

SAND LIME SHAPED PRODUCT

FIELD OF THE INVENTION

The present invention relates generally to "sand lime" shaped products, and particularly to a sand lime masonry products treated with wax during the manufacturing process.

BACKGROUND OF THE INVENTION

Calcium silicate shaped products, generally known as sand lime shaped products, are made from sand, lime and water (e.g., slaked or unslaked lime (quicklime or hydrated lime)). They are typically mixed together, molded under mechanical pressure and may be hardened under steam pressure, such as in an autoclave. Sand lime shaped products may have several different advantages over other masonry products such as (but not limited to) clay and/or concrete pre-cast products. For example, sand lime shaped products may have accurate dimensions, smooth surface, sharp edges and little or no warpage. The shaped products may be made in a variety of colors, and plastering may not be required on both sides of a wall built with sand lime shaped products. The process used to make sand lime shaped products may use siliceous wastes, thereby producing shaped products at less cost. The process may consume less energy than processes to make clay shaped products.

Sand lime shaped products may be prone to various problems associated with moisture or water absorption. For example, the shaped products may become dirty or stained due to the combination of moisture and dirt caused by rain or sprinklers, and the like. Mortar may begin to disintegrate between the shaped products, which can cause the part of the wall to collapse, or single shaped products to crumble or crack. Efflorescence results from shaped products getting wet, wherein salts from the shaped product dissolve in the water and are drawn out of the masonry as the moisture evaporates. Another problem is that once shaped products have become wet, the expansion of freezing water may break off the top surface of the shaped products, leaving the inner surface exposed. After a time, the shaped products may spall or crumble. Another problem is a dramatic increase of thermal conductivity of the soaked product, compared to the dry product due to heat conductivity of the water.

Many attempts have been made in the past to solve these problems, such as externally waterproofing the finished product. For example, U.S. Pat. No. 5,962,585 describes sealing a wall or a ceiling by brushing the external surfaces with a cream containing a silicone compound (e.g., $C_1$–$C_{20}$-alkyl-$C_2$–$C_6$-alkoxysilane).

However, using silicone or silicone-based water repellents externally on masonry products has the inherent disadvantages of high costs, additional coating labor costs, additional curing time and materials that are not friendly to the environment.

Other attempts have been made to solve these problems by incorporating a silicone oil water repellent additive during the sand lime production process. For example, U.S. Pat. No. 4,775,505 describes a process for preparing a water repellent calcium silicate shaped product, comprising dispersing a siliceous source and a calcareous source in water, mixing in a water repellent composition, reacting the mixture under heat to obtain an aqueous slurry that contains a calcium silicate hydrate, and pressfilter-molding the aqueous slurry, followed by drying or drying after steam-curing.

However, using silicone or silicone-based water repellents internally during production of masonry products has the inherent disadvantages of high costs, reduction of physical qualities of the product, and materials that are not friendly to the environment.

In addition, it is noted that the calcium silicate described in U.S. Pat. No. 4,775,505 is not a shaped product intended for bearing structural weights, such as sand lime bricks. Rather, as stated in the description, U.S. Pat. No. 4,775,505 "relates to a process for preparing a calcium silicate shaped product having a low bulk density and excellent flame and heat resistance, mechanical strength and dimensional stability and having uniform water-repellency throughout the interior of the product, which is thus suitable as a flame and heat resistant material, a heat insulator and a lagging material." (Lagging material is thermal wrapping material used to thermally insulate pipes and ducting by wrapping therearound.) In other words, the calcium silicate product of U.S. Pat. No. 4,775,505 is formed into a very light weight product which may be used for thermal insulation purposes and the like (different from the present invention, which may be used for bricks, blocks, tiles, etc). The specific volume of the calcium silicate products in U.S. Pat. No. 4,775,505 is in the range of 15–23 $cm^3/g$, which is a density range of 43.5–66.7 $kg/m^3$ (different from the present invention with a density range of at least 200 $kg/m^3$, preferably 1500 $kg/m^3$).

It is further noted that U.S. Pat. No. 4,775,505 teaches diluting silicone-based water repellents with wax. However, U.S. Pat. No. 4,775,505 clearly states its inability to use wax as the water repellent additive (col. 5 lines 39–42): "the mixing ratio of the silicone oil and the paraffinic compound or low molecular weight hydrocarbon resin is preferably within a range of from 70:30 to 10:90 by weight ratio. Particularly preferred is a range of from 60:40 to 20:80. If the silicone oil is less than the above ratio, the water repellency will be inadequate, and if it exceeds the above ratio, the cost of the water repellent composition tends to be expensive, such being undesirable".

SUMMARY OF THE INVENTION

The present invention seeks to provide an improved sand lime shaped product, as is described in detail further hereinbelow. Wax may be mixed with the raw materials of the shaped product, resulting in a shaped product with advanced hydrophobic properties (that is, water repelling or resisting, the terms being used interchangeably) that may solve the abovementioned problems.

DETAILED DESCRIPTION OF EMBODIMENTS

The sand lime shaped product of the present invention may be made by mixing wax with sand and lime and water to form a mixture, and forming the mixture into a shaped product. For example, wax, sand, hydrated lime and water may be mixed (such as but not limited to, at room temperature or close to room temperature). The wax may be in the form of an emulsion, suspension, solution, or small solid particles (e.g., flakes, powder, pellets, etc.). These terms are defined hereinbelow.

Alternatively, wax, sand, lime and water may be mixed, which causes an exothermic reaction. In such a case, the wax may be in the form of an emulsion, suspension, solution, hot-melt (e.g., liquid stream, liquid droplets or mist), or small solid particles (e.g., flakes, powder, pellets, etc.). Optionally, the sand may first be treated or mixed with wax prior to making the sand lime mixture.

The sand lime-wax-water mixture may then be molded under mechanical pressure and hardened under steam pressure, such as in an autoclave (such as but not limited to, pressure of about 1–85 atmospheres at 100–300° C. for 2–30 hours, or more preferably but not limited to, 5–22 atmospheres at 160–220° C. for 4–24 hours).

In accordance with a non-limiting embodiment of the present invention, the wax may be, but is not limited to, paraffin, paraffin wax, montan wax, candelilla wax, carnauba wax, beeswax, polyethylene wax, polypropylene wax, maleated hydrocarbons and others, or any blend/mixture thereof.

By wax solution, it is meant a homogenous liquid of miscible materials in which wax is dissolved in a main solvent. The wax is in its molecular or ion form.

By wax emulsion, it is meant a stable dispersion of immiscible materials. It is noted that wax in water emulsions of above-micron size particles necessitate emulsifiers to maintain stability. The emulsifiers prevent the wax particles from adhering to or merging with themselves. Water soluble polymer compounds, such as but not limited to polyvinyl alcohol, may be added to the water phase, for the purpose of controlling the viscosity of the emulsion and improving the adhesion between the wax and sand particles.

By wax suspension, it is meant a buoyant dispersion of immiscible materials. It is noted that wax in water suspensions necessitate constant agitation without which the wax particles will rapidly merge to form a continuous wax phase floating on the water. Water soluble polymer compounds, such as but not limited to polyvinyl alcohol, may be added to the water phase, for the purpose of controlling the viscosity of the suspension and improving the adhesion between the wax and sand particles.

"Mixing" in the present invention encompasses adding, coating, dissolving, pouring, or any other action to make the wax substance part of the sand lime mixture which is eventually turned into a finished shaped product.

By sand lime, it is meant a calcium silicate product made mixing sand, lime and water, molding said mixture under pressure to form a shaped product, and autoclaving said shaped product to get a finished product.

"Shaped product" encompasses sand lime molded products, such as but not limited to, bricks, blocks, tiles, claddings, veneers, corner elements, etc.

The shaped products within the scope of the present invention, as opposed to the prior art, have a density of at least 200 kg/$m^3$, preferably at least 500 kg/$m^3$, more preferably at least 1000 kg/$m^3$, such as at least 1500 kg/$m^3$.

Examples of waxes that may be used to carry out the invention, include, but are not limited to:

1. Soft paraffin wax with a melting point in the range of 10–40° C.
2. Macrocrystalline paraffin wax with a melting point in the range of 40–85° C.
3. Microcrystalline paraffin wax with a melting point in the range of 80–120° C.
4. Microcrystalline natural wax (e.g., montan wax) with a melting point in the range of 70–95° C.
5. Any mixture or combination of the above Although the invention encompasses wax in any form as stated above, it may be advantageous to add the wax as a suspension instead of an emulsion to the sand lime mixture. Emulsions have to be stored at the site where the shaped product is produced, and have a limited shelf life. The manufacture of emulsions uses relatively a lot of energy and is relatively costly. In contrast, the raw materials for making the suspension may be much cheaper and much more stable. The wax suspension may be manufactured at the site where the sand lime shaped product is produced, and introduced on-line to the shaped product mixture, thereby providing significant savings in energy, storage, manpower, etc. Due to its online production, the wax suspension is not sensitive to storage and/or storage conditions, such as but not limited to, excessive mechanical shear, pumping, excessively low or high ambient temperature, storage agitation, crust formation, particles agglomeration, and the like.

The invention may be better understood by referring to the following non limiting example:

EXAMPLE 1

Standard mixtures of sand lime bricks were made from sand, lime, crushed limestone and water. A wax suspension was added in various quantities to the mixtures. The wax included a blend paraffin wax of congealing point 57–60° C. and montan wax of congealing point 75–85° C. The water phase of the suspension included fully hydrolyzed polyvinyl alcohol (PVA).

The mixtures self-heated to 70° C., and were allowed to cool for 30 minutes. The cold mixtures were press-molded to bricks under a pressure of 90 bar. The bricks were put in a steam autoclave at 18 bar for 8 hours to become sand lime bricks.

The sand lime bricks were tested for compressive strength, 24-hour water absorption, and capillary water suction rate.

Wax addition rates and test results of these sand lime bricks are shown in Table 1.

TABLE 1

| | Reference | Test 1 | Test 2 | Test 3 |
|---|---|---|---|---|
| Wax additive [%] | 0.0 | 1.8 | 2.3 | 2.9 |
| Compressive strength [mpas] * | 32 | 31.9 | 32.8 | 31.6 |
| Density [kg/$m^3$] ** | 1896 | 1981 | 2053 | 1940 |
| 24 hours water absorption [%] *** | 12 | 6.9 | 6.0 | 8.6 |
| 1.0 hours Capillary suction *** [gr/$m^2$/sqrt(hours) | 3095 | 648 | 491 | 754 |
| 6.0 hours Capillary suction *** [gr/$m^2$/sqrt(hours) | 2920 | 734 | 549 | 988 |
| 24 hours Capillary suction **** [gr/$m^2$/sqrt(hours) | 1947 | 740 | 631 | 733 |

* test according to ASTM C-73-99
** test according to ASTM C-73-99
*** test according to ASTM C-1403-00
*** reference reached equilibrium absorbance 8 hours from test beginning.

It is clear from the examples that the use of the invention imparted significant improvement to the long and short term water resistance of the sand lime bricks, without damaging their compressive strength.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A sand lime shaped product comprising a mixture of wax mixed with sand lime and water, said mixture mechanically molded and hardened under steam pressure into a shaped product having a density of at least 200 kg/$m^3$.

2. The sand lime shaped product according to claim 1, wherein the density of said shaped product is at least 500 kg/m$^3$.

3. The sand lime shaped product according to claim 1, wherein the density of is at least 1000 kg/m$^3$.

4. The sand lime shaped product according to claim 1, wherein the density of said shaped product is at least 1500 kg/m$^3$.

5. The sand lime shaped product according to claim 1, wherein said wax comprises a wax emulsion that includes wax and at least one emulsifier.

6. The sand lime shaped product according to claim 1, wherein said wax comprises a wax suspension that includes wax suspended in a fluid.

7. The sand lime shaped product according to claim 1, wherein said wax comprises a wax solution that includes wax dissolved in a solvent.

8. The sand lime shaped product according to claim 1, wherein said wax comprises melted wax.

9. The sand lime shaped product according to claim 1, wherein said wax comprises at least one of wax particles, wax flakes and wax powder.

10. A method for making a sand lime shaped product, comprising:

mixing wax with sand lime and water to form a mixture; and molding said mixture under mechanical pressure and hardening said mixture under steam pressure into a shaped product having a density of at least 200 kg/m$^3$.

11. The method according to claim 10, comprising forming said mixture into a shaped product having a density of at least 500 kg/m$^3$.

12. The method according to claim 10, comprising forming said mixture into a shaped product having a density of at least 1000 kg/m$^3$.

13. The method according to claim 10, comprising forming said mixture into a shaped product having a density of at least 1500 kg/m$^3$.

14. The method according to claim 10, wherein said wax comprises a wax emulsion that includes wax and at least one emulsifier.

15. The method according to claim 10, wherein said wax comprises a wax suspension that includes wax suspended in a fluid.

16. The method according to claim 10, wherein said wax comprises a wax solution that includes wax dissolved in a solvent.

17. The method according to claim 10, wherein said wax comprises melted wax.

18. The method according to claim 10, wherein said wax comprises at least one of wax particles, wax flakes and wax powder.

19. The method according to claim 10, comprising treating the sand with wax before mixing with lime to form said mixture.

* * * * *